Dec. 7, 1965     G. W. GRAY     3,222,637
DETECTION APPARATUS
Filed Sept. 12, 1962     4 Sheets-Sheet 1

INVENTOR.
GEORGE W. GRAY
BY
Morris Rabkin
ATTORNEY

Dec. 7, 1965     G. W. GRAY     3,222,637
DETECTION APPARATUS
Filed Sept. 12, 1962     4 Sheets-Sheet 2

INVENTOR.
GEORGE W. GRAY
BY

ATTORNEY

Fig. 3.

Dec. 7, 1965  G. W. GRAY  3,222,637
DETECTION APPARATUS
Filed Sept. 12, 1962  4 Sheets-Sheet 4

INVENTOR.
GEORGE W. GRAY
BY
ATTORNEY

United States Patent Office 3,222,637
Patented Dec. 7, 1965

3,222,637
DETECTION APPARATUS
George W. Gray, Lambertville, N.J., assignor to Radio Corporation of America, a corporation of Delaware
Filed Sept. 12, 1962, Ser. No. 223,196
9 Claims. (Cl. 340—38)

This invention relates to detection apparatus, and particularly to systems and circuits for the detection of vehicles and other objects.

The invention is especially suitable for use in highway vehicle control apparatus for controlling the operation of traffic lights, traffic counters and the like. The invention may also find use in an electrical system for automatically controlling vehicular traffic on highways such as disclosed in U.S. patent, 2,847,080, issued on August 12, 1958, to V. K. Zworykin, L. E. Flory and W. S. Pike. Uses for the invention may also be found in apparatus for detecting objects other than vehicles, as well as for the detection of information carried by electrical signals.

Among the objects of this invention are to provide an improved detection system which is (1) more sensitive to the objects to be detected, (2) better compensated for changes in operating conditions, such as weather and other ambient conditions, and (3) lower in cost than detection systems known heretofore having similar operating characteristics.

A further object of the invention is to provide an improved vehicle detection apparatus which facilitates the free flow of traffic in spite of vehicles stopped for a prolonged period of time in a detection zone.

It is a still further object of the present invention to provide an improved phase detector system especially suitable for use in vehicle detection apparatus, which system provides a greater sensitivity at lower cost than known phase detectors.

It is a still further object of the present invention to provide an improved phase detector circuit in which high sensitivity is obtained without the need for direct current amplification.

It is a still further object of the present invention to provide detection apparatus having improved compensation means which is especially suitable to compensate the apparatus for changes in weather and other ambient conditions, and which is faster acting and has lower electrical power consumption than previously proposed compensation means for the same purpose.

Briefly described, the invention may be embodied in a vehicle or other object detection apparatus which uses a sensing means which reflects the presence of a vehicle or other object in a sensing zone by an output which changes in one of two opposite senses. However, the sensing means responds to changes in operating conditions, such as the weather and other ambient conditions, by a change in its output in either of these two opposite senses. Compensating means according to the invention is associated with the sensing means and is responsive to the output thereof.

More particularly, in a preferred embodiment, the compensating means is operative to change the electrical characteristics of the sensing means in opposite senses corresponding to the changes in the sense of the output from the sensing means. Such characteristics are changed relatively slowly to compensate for an output change in one sense due to a vehicle, and relatively rapidly for an output change in the opposite sense due to other causes. For example, some weather and other ambient conditions, such as precipitation, provide a change in output in a sense opposite to the change in output due to a vehicle. Thus, the apparatus can be compensated rapidly for weather conditions which might adversely affect its operation. The apparatus also facilitates traffic flow. It is desirable to allow a traffic light to change from red to green after a predetermined time even though a vehicle is stalled in a detection zone so as to permit traffic flow around the stalled vehicle. The compensating means of the present invention can compensate for an output due to the stalled vehicle and allow the desired traffic flow. When the stalled vehicle is removed from the sensing station, the sensing means provides an output change in the sense opposite to the change due to the vehicle and the electrical characteristics of the sensing means rapidly return to their normal value. A succeeding car which passes into the sensing station is then detected.

Sensing means embodying the invention is desirably a phase detection system responsive to the phase difference between a first or reference wave and a second or variable wave of the same frequency and amplitude, but of variable phase, such as the reference wave which shifted in phase after passing through the sensing coil. The phase detector includes a coincidence circuit to which the reference wave and variable wave are applied in 180° out of phase relationship. This circuit responds to coincident and non-coincident portions of the reference wave and variable wave and provides pulses having amplitudes and phase relationships respectively corresponding to the amount and sense of the phase shift of the variable wave with respect to the reference wave. Circuit means are provided for deriving the alternating current component of the pulses at the frequency of the reference wave so as to provide an A.C. output signal. This A.C. output signal has an amplitude and phase, with respect to the reference wave, depending upon the sense and amount of the phase shift of the variable wave with respect to the reference wave. A balanced-type detector circuit responsive to the reference wave and the A.C. output signal derives an output voltage which corresponds to the magnitude and the sense of the phase shift of the variable wave with respect to the reference wave. In a vehicle detection system, a phase shift in one sense is indicative of a vehicle in the detection zone. Accordingly, the sense of the outputs may be used to control the compensating means for rapidly compensating for phase shifts due to weather and other ambient conditions and slowly compensating for phase shifts resulting from the detection of a vehicle.

The compensating means may include a motor, if desired, which varies the electrical characteristics of the sensing means. A circuit for controlling this motor includes means responsive to an output which may be derived from a phase detector for controlling the flow of current to the motor and causing the motor to rotate. A positive feedback connection is provided between the motor and the motor current control means for applying a signal to the motor current control means in a direction to increase motor current and tend to cause the motor to rotate as long as any signal is applied to the motor current control means, and at maximum speed. Moreover, power consumption is low, since even though signals are applied which might be insufficient to produce enough current flow through the motor to cause rotation, the positive feedback soon develops enough motor current for high speed motor rotation. Thus, the system is fast operating in its compensation.

The invention itself, both as to its organization and method of operation, as well as additional objects and advantages thereof, will become more readily apparent from a reading of the following description in connection with the accompanying drawings, in which:

System in general

Figure 1:
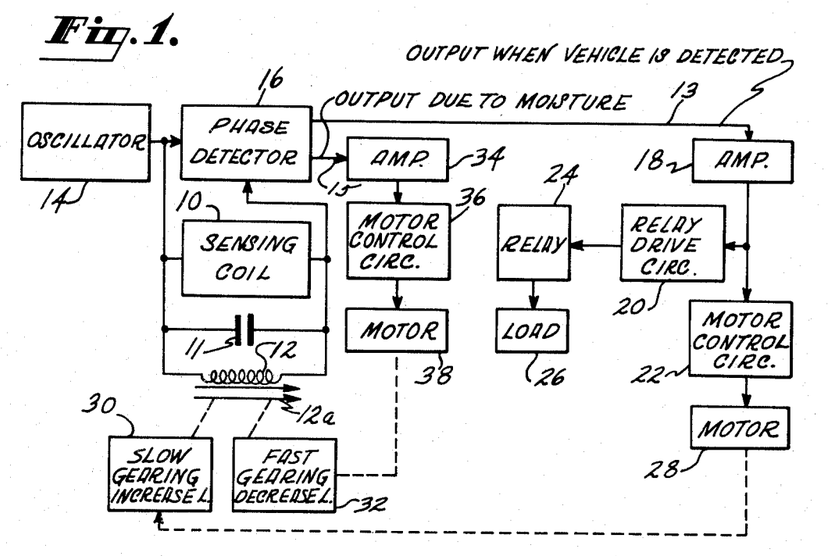
FIG. 1 is a block diagram of a vehicle detection system embodying the invention.

Referring more particularly to FIG. 1, there is shown a vehicle detection system including a sensing device in the form of a sensing coil 10. The coil may be a loop of several turns of wire several feet across which is imbedded below the surface of a highway pavement over which vehicles travel. The sensing coil 10 defines a vehicle detection zone in its vicinity. The inductive reactance of the coil decreases when a vehicle is present in the detection zone. Changes in the reactance of the coil are also caused by changes in weather, such as rain, ice and snow on the highway, and by other ambient conditions, such as aging of insulation, temperature and the like. In order to compensate for such changes, a compensating means include a variable inductor 12 having a movable core 12a is connected across the sensing coil 10. The sensing coil 10 and the variable inductor 12 are connected in parallel with a capacitor 11 to provide a tuned circuit. The circuit is tuned to the frequency of operation of an oscillator 14 which provides reference waves at 100 kc. (kilocycles per second), for example.

The reference waves pass through the tuned circuit including the sensing coil 10, the capacitor 11 and the variable inductor 12. Changes in the tuning of the tuned circuit from resonance at 100 kc. varies the phase of the waves which pass therethrough with respect to the reference waves. The waves passed through the tuned circuit are referred to hereinafter as variable waves in order to facilitate the description. Since the reactance of the sensing coil 10 changes in response to a vehicle in the detection zone and also to changes in weather and other conditions, the tuning of the tuned circuit and the phase of the variable waves with respect to the reference waves change either upon detection of a vehicle or in response to changes in weather conditions. The phase of the variable waves may change in opposite senses with respect to the reference waves when a vehicle is detected and when weather conditions change, as when there is precipitation on the highway, for example. It has been found that a vehicle effectively decreases the inductance of the sensing coil 10, while precipitation increases the effective inductance of that coil. This change in effective inductance alters the tuning of the tuned circuit and provides the above mentioned changes in phase.

The variable waves and the reference waves are applied to a phase detector 16, which is described in detail hereinafter in connection with FIGS. 2 and 4 of the drawings. The difference in phase between the reference waves and the variable waves results in an output signal on one or the other of a pair of output lines 13 and 15, respectively, for a phase shift of the variable waves in one sense with respect to the reference waves and a phase shift in the opposite sense with respect to the reference waves. As appears more fully hereinafter, one of the output lines, say the line 13, carries the output upon the detection of a vehicle, while the other line 15 carries the output which results from a change in weather, such as rain, snow or ice, in the detection zone. The phase detector output on the line 13, indicative of the detection of a vehicle, is applied to an amplifier 18. The output of this amplifier 18 is used in a relay drive circuit 20 and in a motor control circuit 22.

Figures 5, 6:
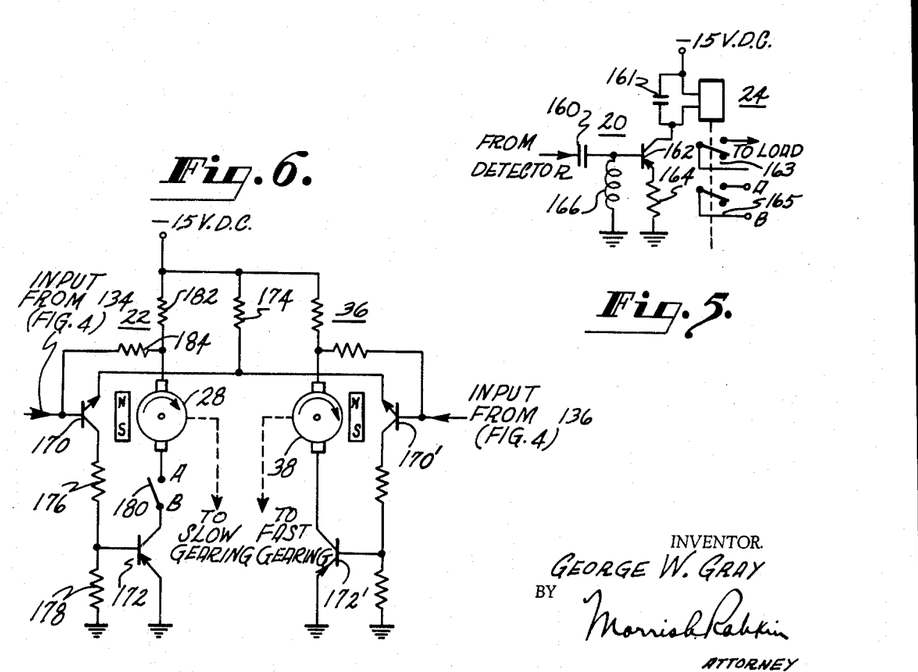
FIG. 5 is a circuit diagram of a relay drive circuit and a relay circuit shown illustratively, in FIG. 1.
FIG. 6 is a circuit diagram of the motor control circuits of FIG. 1.

The relay drive circuit 20, shown in greater detail in FIG. 5, operates a relay 24 upon detection of a vehicle. The relay 24 may have several sets of contacts through one of which a load 26 is actuated. This load may be any utilization means, such as a traffic counter, signaling system, traffic light or other indicating device.

The motor control circuit 22, shown in greater detail in FIG. 6, operates a motor 28 which drives gearing mechanism 30 coupled to drive the core 12a of the variable inductor 12 in a direction to increase its inductance. The core is driven in the opposite direction to decrease the inductance of the inductor 12 by the other gearing mechanism 32. The gearing in the mechanism 30 has a much lower gear ratio from input to output than in the mechanism 32, e.g. twenty to one. The mechanism 30 therefore moves the core 12a much slower than does the mechanism 32.

The phase detector output carried on the line 15 is amplified in an amplifier 34 and applied to a motor control circuit 36 (FIG. 6). A motor 38 is controlled by the motor control circuit 36 to turn the fast gearing mechanism 32 when the other output signal is provided by the phase detector 16.

In operation, the motors 28 and 38 turn at the same speed and in the same direction when output signals are applied to their respective control circuits 22 and 36. The mechanisms 30 and 32 move the core 12a in opposite directions at relatively slow and relatively rapid speeds, respectively, because of their different gear ratios. The slow gear mechanism retunes the circuit including the sensing coil in response to decreases in the coil 10 inductance, such as may be caused by weather conditions changing from a relatively moist state to a relatively dry state, or by a vehicle entering the sensing coil 10, before the relay 24 is operated.

When a vehicle enters the detection zone, it tends to decrease the inductance of the sensing coil 10 of FIG. 1. The resulting phase shift of the variable wave causes the detector 16 to provide an output on line 13. This output is amplified and operates the relay drive circuit 20 to cause the relay 24 to pull in. The load 26 is then actuated and the presence of the vehicle is indicated. The motor control circuit 22 also operates in response to the output from the detector 16 on the line 13 and actuates the motor 28 which turns the slowly operating gear mechanism 30. The inductance of the variable inductor 12 then tends to increase, thus tuning out the decrease in inductance of the sensing coil 10 due to the vehicle.

Because the gearing mechanism 30 operates slowly, a vehicle is indicated by the load 26 for a predetermined time, even though it is stalled in the detection zone. After the tuned circuit is returned, the presence of the vehicle is no longer detected. When a second vehicle enters the detection zone, the inductance of the sensing coil again changes sufficiently to provide an output from the phase detector 16, and this again operates the relay 24. Thus, the system continues to be operated nothwithstanding the presence of a stalled vehicle. Flow of traffic through an intersection controlled by the detection system is therefore permitted even though a vehicle is stalled in the detection zone. When the stalled vehicle leaves the zone, the tuned circuit will be off resonance in an opposite sense because of the increased inductance of the inductor 12. For a phase shift in the opposite sense, the phase detector provides an output on the other line 15. The latter output operates the motor control circuit 36 which actuates the motor 38 to drive the gear mechanism 32 which rapidly retunes the tuned circuit including the sensing coil 10.

Each time a vehicle is in the detection zone, the slow gear mechanism 30 slowly tends to retune the tuned circuit which includes the sensing coil 10. Since the gear mechanism 30 operates very slowly, the amount of retuning is slight when the vehicles remain for short times in the detection zone, and there usually is little loss in detection sensitivity. When the vehicle leaves the detection zone, an output is provided on the output line 15 and the fast gear mechanism is operated to rapidly retune the tuned circuit. Since the fast mechanism 30 operates rapidly, the detector is normally returned to full sensitivity before the next vehicle enters the detection zone.

*Phase detector (FIGS. 2–4)*

Figure 2:
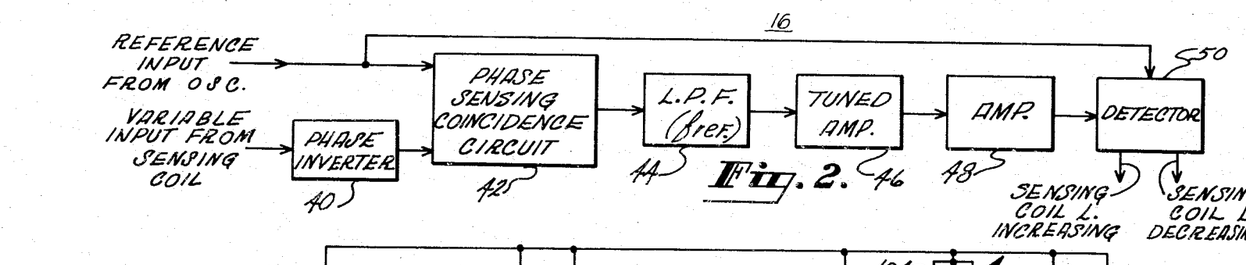
FIG. 2 is a block diagram of an improved phase detector which is used in the vehicle detection system shown in FIG. 1.

The phase detector 16 is shown in FIG. 2. A phase sensitive coincidence circuit 42 receives a reference input from the oscillator 14 and a variable input from the tuned circuit which includes the sensing coil 10 of FIG. 1. Both inputs are sinusoidal alternating current waves desirably of equal amplitude about the zero axes thereof. The variable waves are inverted in phase in a phase inverter 40, such as an amplifier or other phase inverting device, so that the circiut 42 receives the waves in 180° out of phase relationship.

The circuit 42 operates to detect when alternate half cycles of the reference waves and of the variable waves are in and out of coincident or overlapping relationship and provides an output signal, desirably a train of pulses, indicative of the presence and absence of coincidence between the alternate half cycles of the different waves. The output signal has an A.C. frequency component at the same frequency as the reference and variable waves, since the periods of coincidence or lack of coincidence between alternate half cycles of these waves occur once during each cycle of the waves. When the output signal is a train of pulses, the pulses have amplitudes and phase displacements respectively indicative of the amount and sense of the phase displacement of the variable waves with respect to the reference waves.

The phase detector 16 includes a filter 44 which extracts the A.C. component of the output signal from the circuit 42. This component is amplified in a tuned amplifier 46 and in another A.C. amplifier 48. Sufficient amplification is provided to obtain the desired degree of sensitivity to small phase differences between the reference and variable waves. Since low cost A.C. amplifiers may be used in the detector 16, it provides higher sensitivity at lower cost than may be obtained with known phase detectors requiring D.C. amplifiers.

A pair of D.C. signals representing leading and lagging phase shifts of the variable wave with respect to the refer- wave may be obtained with a balanced-type detector 50 to which the reference waves and the output of the amplifier 48 are applied.

The phase sensitive coincidence circuit 42 of FIG. 2 may include an amplifying type AND gate sensitive to overlapping portions and non-overlapping portions of alternate half cycles of the 180° out-of-phase variable and reference waves. The inclusion of amplification makes the circuit 42 highly sensitive to the phase relationship between the reference and variable waves. The output of the circuit 42 is a pulse train which carries the phase information and has an A.C. component. Extraction of this A.C. component is accomplished in the low-pass filter circuit 44. This filter circiut may, for example, be an L-C circuit tuned to resonance at the reference wave frequency (100 kc.). More sophisticated forms of filter circuits, such as shown in FIG. 4, are also suitable. The phase detector 16 is more immune to noise than many known phase detectors since the filter circuit 44 isolates the input and output of the detector for noise signals which are usually at frequencies other than those which can pass through the filter 44.

The tuned amplifier 46 amplifies the output of the filter 44 and also shifts the phase of the signals at its output with respect to the signals applied to its input so as to facilitate the detection of the sense of the phase difference of the variable waves with respect to the reference waves in the detector 50.

Figure 3:
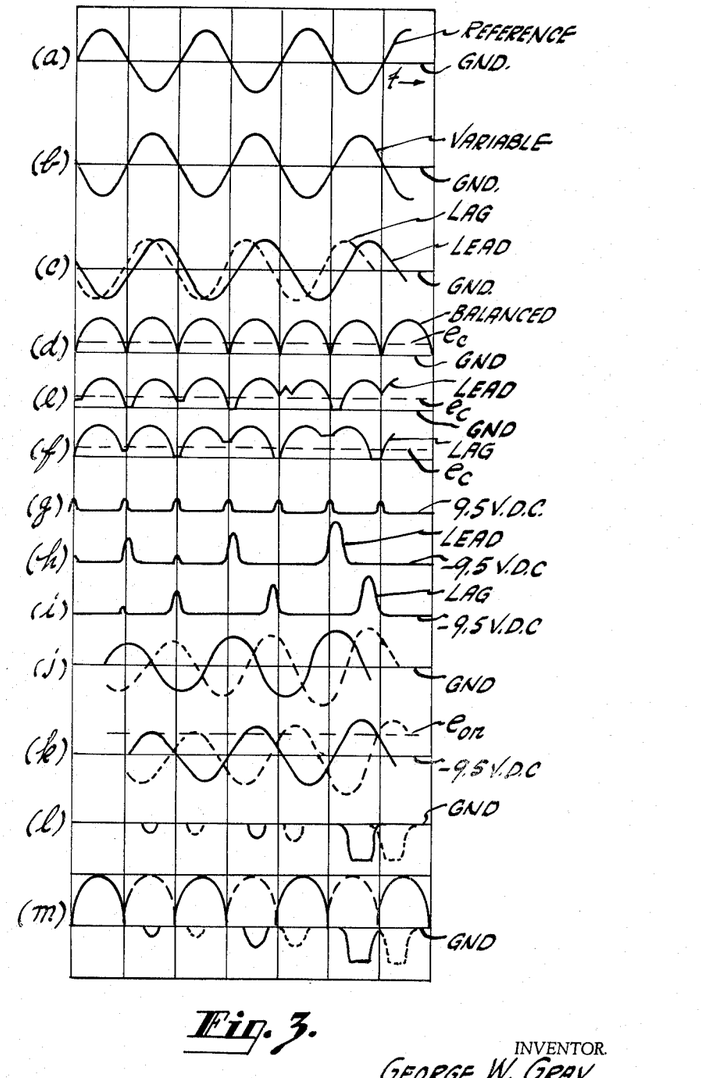
FIG. 3 is a display of wave forms of signals at different points in the phase detector shown in the circuit diagrams of FIGS. 2 and 4.
Figure 4:
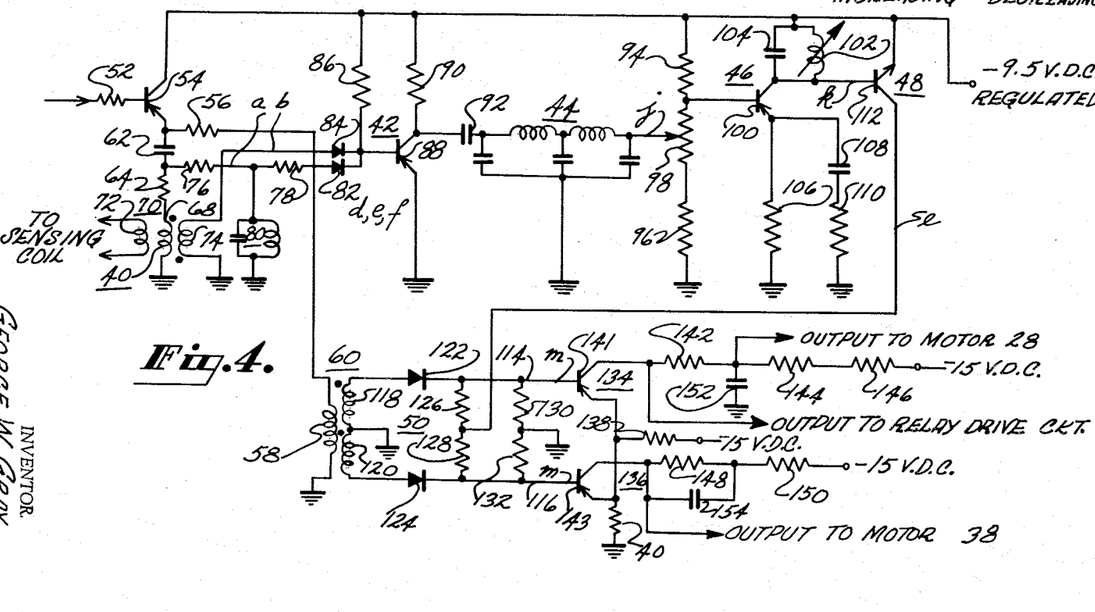
FIG. 4 is a circuit diagram of the phase detector of FIG. 2.

A circuit diagram of a presently preferred embodiment of the phase detector 16 is shown in FIG. 4. The operation of the detector will be more readily understood from the wave forms of FIG. 3. The reference waves from the oscillator 14 which provide the reference input are applied through a resistor 52 to the base of a PNP transistor 54 operated as an emitter follower amplifier. An emitter resistor 56 of the transistor 54 amplifier is connected to ground through the primary winding 58 of a transformer 60 which forms the part of the detector 50. The reference waves at the emitter of the transistor 54 are fed through a capacitor 62 and an isolating resistor 64 to a winding 68 of a transformer 70. The sensing coil 10 (FIG. 1) is connected across an input winding 72 of the transformer 70. The transformer 70 also includes an output winding 74 which is wound in an opposite sense to the winding 68, as indicated by the dots shown at the ends of the winding 68 and 74. The impedance of the sensing coil and its associated tuned circuit is reflected by transformer action across the output winding 74. The reference waves translated from the winding 68 to the winding 74 are therefore shifted in phase by an amount which depends upon the impedance, and particularly the inductive reactance, of the sensing coil 10. Since the winding 68 to which the reference waves are applied has an opposite winding sense from the output winding 74, the waves from the output winding 74 are inverted and are 180° out of phase, or nearly so, with respect to the reference waves. The transformer 70 therefore provides the phase inverter 40 shown in FIG. 2.

The reference waves are applied through an isolating resistor 76 and another resistor 78 to one input of the phase sensitive coincidence circuit 42. A parallel tuned circuit 80 tuned to the frequency of the reference waves (100 kc.) is connected between ground and the junction of the resistors 76 and 78. Since the output winding 74 and the tuned circuit 80 are both returned to ground, the zero axes of the reference and variable waves applied to the inputs of the circuit 42 are at ground potential. The resistor 78 provides sufficient attenuation to equalize the amplitudes of the reference waves from the transistor 54 with the variable waves from the output winding 74 of the transformer 70.

The reference waves applied through the resistor 78 to one of the inputs of the phase detector are shown in wave form (*a*) of FIG. 3. The variable waves, 180° out of phase with the reference waves, but having the same zero axes (ground) and the same amplitude as the reference waves are shown in wave form (*b*). The balanced phase relationship of the reference and variable waves change when a vehicle enters the detection zone of the sensing coil 10 and also in response to ambient and weather condition variations. A phase lead (advance) of the variable wave with respect to the reference wave is exemplified by the solid curve in wave form (*c*), while a phase lag (delay) is exemplified by the dash line curve. For purposes of illustration, gradually increasing phase advances and delays in successive cycles are shown in wave form (*c*). A phase advance results from a decrease in inductance of the sensing coil due to the entry of a vehicle into the detection zone. A phase delay is usually caused by precipitation such as snow, rain and ice on the highway. However, changes in ambient conditions may produce a phase advance or a phase delay of the variable waves with respect to the reference waves.

The phase sensitive coincidence circuit 42 includes a pair of diodes 82 and 84 both polarized to permit current to flow into the circuit 42 in the same direction. The cathodes of these diodes are connected to a resistor 86 which is returned to ground through a source of operating voltage for the detector 16 (e.g., −9.5 volts D.C.).

The cathodes of the diodes are also connected to the base of a PNP transistor 88. The emitter of this transistor 88 is grounded and its collector is connected to the operating voltage source through a resistor 90. The transistor 88 is biased into conduction by voltage from the source applied to its base through the resistor 86.

Since the transistor 88 is normally conductive, the cathodes of the diodes 82 and 84 are normally returned to ground through the emitter-to-base path of the transistor 88, which path has a low resistance. Accordingly, the diodes 82 and 84 respectively transmit only the positive half cycles of the reference and variable waves. These waves additively combine with each other across the resistor 86, and the sum of the voltages of the waves appears at the base of the transistor 88.

The wave forms at the base of the transistor 88 when the reference and variable waves are balanced (180° out of phase relationship) is shown in wave form $(d)$. Wave forms $(e)$ and $(f)$ respectively show the shape of the waves at the base of the transistor 88 when a phase advanced and phase delayed relationship corresponding to wave forms $(c)$ exists between the variable wave and the reference wave.

When the voltage at the base of the transistor 88 is sufficiently positive to overcome the bias applied to the base of the transistor 88 through the resistor 86, the transistor 88 is cut off. The cut-off bias is shown in wave forms $(d)$, $(e)$ and $(f)$ by the dash line $e_c$. In other words, the amplitude of the voltage at the cathodes of the diodes 82 and 84 must exceed (be more positive than) $e_c$ before the transistor 88 is cut off.

When the reference and variable waves are balanced, these waves do not overlap. Accordingly, the transistor 88 is cut off except for a short time interval, once during each half cycle of the reference and variable waves, which occurs near the zero axes of these waves. It may be desirable, for some applications, to adjust the cut-off bias $e_c$ so that the transistor 88 is almost cut off when the reference and variable waves are in balanced relationship. However, it is preferred to permit some conduction through the transistor 88 to allow for tolerances in circuit components and aging of components which might change the balance during prolonged periods of use.

When the reference and variable waves are out of phase, the positive half cycles of these waves overlap and are separated to greater and lesser extents depending upon the amount of phase displacement therebetween. When the half cycles overlap, the sum of the voltages at the base of the transistor 88 tends to exceed the cut-off bias $e_c$, and one of the two periods of conduction becomes smaller than when the waves are balanced (see wave form $(d)$). However, the other period of conduction becomes longer where the half cycles are separated from each other, since the bias $e_c$ is not exceeded. Whether the leading or lagging period of conduction is increased or decreased depends upon the sense of the phase displacement of the reference and variable waves.

An exemplary case where the variable waves become more advanced in phase with respect to the reference waves during successive cycles is illustrated in wave form $(e)$. The periods of the half cycles of the reference and variable waves during which the half cycles are separated from each other become larger. Also, the periods during which the half cycles overlap increases. The periods of overlap occur later than the periods of separation with respect to the cycles of the reference waves.

As shown in wave form $(f)$, the periods of overlap occur earlier in the cycle of the reference waves than the periods when the variable waves become more delayed in phase with respect to the reference waves during successive cycles thereof.

Pulses of current pass through the transistor 88 when the bias $e_c$ is not exceeded. Voltage pulses appear across the collector resistor 90 due to the current pulses passing through the transistor 88. These voltage pulses are shown in wave forms $(g)$, $(h)$ and $(i)$, and respectively correspond to transistor 88 input wave forms $(d)$, $(e)$ and $(f)$. The transistor 88 is conductive when adjacent positive half cycles of the reference and variable waves are separated, since the voltage on the base of the transistor 88 then remains more negative than $e_c$. The voltage pulses increase in magnitude with the increased periods of separation of the adjacent half cycles because the distributed and lumped capacitances in the circuit across the collector resistor 90 change to higher voltages in response to longer periods of current conduction through the transistor 88. The amplitude of the voltage pulses produced by the circuit 42 corresponds to the amount of the phase shift, since the separations between adjacent positive half cycles of the reference and variable waves also depends on the phase shift therebetween.

When the positive half cycles overlap, the positive voltage due to the summation of the voltages in each adjacent, overlapping, half cycle portion tends to exceed the negative bias on the base of the transistor 88. Thus, the periods of conduction of the transistor 88 and the amplitudes of the pulses produced across the collector resistor 90 diminish, with increasing phase shifts, where the half cycles overlap. Since overlapping and separated portions of the waves including the positive half cycles occur at opposite extremes of each half cycle for phase advances and for phase delays, the phase relation of the pulses in the train corresponds to the sense of the phase shift of the variable waves with respect to the reference waves.

As shown in wave forms $(h)$ and $(i)$ displacement of the variable and reference waves causes alternate ones of the pulses produced during each half cycle, when the reference and variable waves are balanced, to increase and decrease amplitude. When the phase shifts, the amplitude of alternate pulses in the pulse train becomes larger, and there appears, in the pulse train, an alternating current component at the frequency of the reference wave. For large phase shifts, only one pulse is produced per reference wave cycle. This permits the phase shift information to be extracted from the pulses in the form of alternating current waves at the reference wave frequency by means of the filter 44.

The pulses are fed through a capacitor 92 to the filter 44. The filter is a low pass type having two cascaded $\pi$ sections resonant at 100 kc. (the frequency of the reference waves). Accordingly, the filter extracts the 100 kc. component of the pulse trains. When the variable and reference waves are in balanced phase relationship, pulses at a frequency of twice the reference waves (200 kc.) are applied to the filter 44. The filter does not pass these the double frequency pulses. The filter 44, however, converts the pulse trains representing phase shifts into A.C. waves carrying the phase shift information. The filter also prevents high frequency noise transmission to the output of the detector 16.

The phase of the A.C. waves provided by the filter 44 depends upon the time displacement of the pulses in the pulse trains. The amplitude of the A.C. waves depends upon the amplitude of the pulses. The A.C. waves corresponding to the pulse train shown in wave forms $(h)$ and $(i)$ are illustrated respectively by the full and dash line curves of wave form $(j)$.

Since the phase detector translates the phase information into A.C. waves, A.C. amplification can be used. This is less complicated than D.C. amplification usually necessary in sensitive phase detectors.

The output of the filter 44 is applied to a variable attenuator including resistors 94 and 96 and a potentiometer 98. The voltage across the potentiometer 98 and resistor 96 is applied to the base of a PNP transistor 100. The collector of this transistor 100 is connected to the source of operating voltage through a parallel tuned circuit including a variable inductor 102 and a capacitor 104. The emitter of the transistor 100 is connected to ground through a biasing circuit including a resistor 106 across which are a series connected capacitor 108 and resistor 110. The transistor 100 is biased for class A operation by voltage from the source applied across the resistor 94. The variable inductor 102 in the collector circuit of the transistor 100 provides for shifting the phase of A.C. waves applied to the amplifier and amplified therein so as to facilitate detection of the sense of the phase shift of the variable waves with respect to the reference waves.

As illustrated in wave form $(k)$, the phase of the A.C. waves applied to the amplifier 48 from the tuned amplifier 46 is advanced with respect to the reference wave so that the peaks of the A.C. wave occur approximately near the positive and negative peaks (90° and 270° regions) of the reference wave.

The output of the tuned amplifier 46 is applied to the amplifier 48 which then operates to clip the positive portions of the signal from the tuned amplifier 46. The amplifier 48 includes an NPN transistor 112 having its emitter connected to the source of operating voltage and its collector connected to an input of the detector 50. The base of the transistor 112 is biased to approximately the same voltage as the emitter through the inductor 102. The amplifier 48 therefore clips the negative portions of the A.C. waves from the output of the tuned amplifier 46. The clipping level is shown by the dash line $e_{on}$ in wave form $(k)$ of FIG. 3.

The phase detector 50 has two lines 114 and 116 which respectively carry output signals corresponding to a phase advance of the variable wave with respect to the reference wave and a phase delay of the variable wave with respect to the reference wave. The phase detector 50 also includes the transformer 60. The reference waves are applied to the primary winding 58 of the transformer 60. Secondary windings 118 and 120 of equal numbers of turns are also included in the transformer 60. These windings 118 and 120 are connected in opposite senses to ground, as indicated by the dots at the ends thereof. The reference waves 180° out of phase with each other are therefore obtained on the ungrounded sides of the windings 118 and 120.

The transformer 60 is a step-up transformer and desirably provides A.C. voltages having a peak amplitude greater than the peak amplitudes of the waves applied to the detector circuit 50 from the clipping amplifier 48. Diodes 122 and 124 are connected, polarized in the direction to carry current away from the windings between different sides of the windings 118 and 120 and different ones of a series connected pair of equal-value resistors 130 and 132. The junction of these resistors is grounded. A second pair of equal-value, series connected resistors 126 and 128 is connected across the resistors 130 and 132. The resistors 130 and 132 are the output resistors of the detector 50. The resistors 126 and 128, 130 and 132 are included in the amplifier circuit 48. The output voltages from the amplifier are applied to the junction of the resistors 126 and 128.

In operation, the clipping amplifier 48 output is applied across (1) the resistors 126 and 130 and across (2) the resistors 128 and 132 and is effectively gated by the 180° out-of-phase components of the reference wave which appear across the secondary windings 118 and 120. As shown in wave form $(l)$, the pulses across the resistors 126 and 130, and across the resistors 128 and 132 are negative pulses smaller in amplitude than the peak amplitude of the reference waves across the windings 118 and and 120. The diodes 122 and 124 pass the positive half cycles of the waves applied therethrough. As shown in wave form $(m)$, when a positive half cycle of the reference wave is transmitted either through the diode 122 or the diode 124 simultaneously with a negative output pulse from the output of the amplifier 48 which appears across the resistors 130 and 132, the negative output pulse is blocked and the resulting voltage across the resistors 130 and 132 is essentially only the positive half cycles of the reference wave. Since the diodes 122 and 124 block the transmission of the negative half cycles of the reference wave, negative output pulses from the amplifier 48 which occur during the negative half cycles of the reference waves appear across the resistors 130 and 132. Comparison of waves forms $(l)$ and $(a)$, respectively illustrating the output of the amplifier 48 and the reference waves, shows that output pulses resulting from a phase advance of the variable waves with respect to the reference waves occur during positive half cycles of the reference waves, whereas output pulses due to phase delay of the variable waves with respect to the reference waves occur during negative half cycles of the reference waves. Output pulses due to a phase advance, as shown in wave form $(l)$, occur during negative half cycles of the reference wave and appear across the resistor 130 and on the output line 114 (see solid line curve of wave form $(m)$). Similarly, the output pulses due to a phase delay occur during negative half cycles of the inverted reference wave from the winding 120 and appear on output line 116 (see dash line curve of wave form $(m)$).

The lines 114 and 116 are connected to clipping amplifiers 134 and 136 respectively. These amplifiers form parts of the detector 50 and include PNP transistors 141 and 143 which are biased by means of a voltage divider including resistors 138 and 140. This voltage divider is connected across a source, such as −15 v. D.C. supply. The transistors 134 and 136 are therefore biased to transmit only the negative portions of the waves applied thereto. These negative portions will correspond to the negative pulses shown in wave form $(m)$. The amplifier 134 also includes resistors 142, 144 and 146 which are connected between the collector of the transistor 141 and the source of operating voltage of −15 volts D.C. The collector of the other transistor 143 in the amplifier 136 is connected to the operating voltage source through other resistors 148 and 150. The amplifiers 134 and 136 amplify the negative portions of the signals applied to their inputs. Since a polarity inversion occurs within the amplifier, positive pulses are obtained between the collectors of the transistors 141 and 143 and ground.

A capacitor 152 connected between the junction of the resistors 142 and 144 and ground cooperates with these resistors to form a filter circuit for translating the pulse output from the amplifier 134 into a D.C. output voltage for use in a motor control circuit to be described in detail in connection with FIG. 6. Another capacitor 154 is connected across the resistor 148 in the collector circuit of the transistor 143 and cooperates with the resistors 148 and 150 to filter the pulses from the output of the amplifier 136 and to provide a D.C. output for operating the other motor control circuit to be described in connection with FIG. 6. The capacitors 152 and 154 are respectively in parallel and in series with the collectors in the respective cellector circuits of the amplifier 134 and 136. Thus, connection of the capacitors has been found to eliminate starting transients.

An output is obtained from the amplifier 134 in the phase detector 16 to drive the relay drive circuit 20 shown in FIG. 5. This relay drive circuit includes a capacitor 160 for coupling the amplified pulses at the collector of the transistor 141 to the base of a PNP transistor 162. The collector of this transistor is connected to the operating winding of the relay 24 which is shunted by a filter capacitor 161. The emitter of the transistor is connected to ground through a resistor 164 and the base is returned to ground through an inductor 166. The inductor prevents accumulation of charge on the capacitor 160 which might change the effect bias on the base of the transistor 162. The relay 24 pulls in only when a train of output pulses is obtained from the amplifier 134 of sufficient amplitude to be indicative of a phase shift of the variable waves with respect to the reference waves caused by the presence of a vehicle in the detection zone on the highway.

The relay 24 has two sets of contacts, 163 and 165. A load is connected to one of the sets of contacts, say the contacts 163. This load may be a traffic light, counter or other indicating devices. The other set of contacts 165 has output terminals, A and B. These terminals are connected to the motor control circuit of FIG. 6 for preventing operation of the motor 28 when a vehicle is detected, and utilized when such prevention of motor operation upon the detection of a vehicle is desired, as explained hereinafter.

*Motor control circuits (FIG. 6)*

The motor control circuits are shown in FIG. 6. The two circuits 22 and 36 for respectively controlling current to the motors 28 and 38 are used. These circuits are similar and are interlocked with each other so that when one of the motors operates the other does not. The motor control circuit 22 uses an input NPN transistor 170 and an output PNP transistor 172. The input transistor 170 is emitter connected to a source of operating voltage (−15 v. D.C.) through a resistor 174. This source, as the other sources of operating voltage described herein, may be an A.C. rectifier and filter power supply of known design the outputs of which are returned to ground. The collector of the transistor 170 is connected to ground through resistors 176 and 178. The D.C. signal obtained from the amplifier 134, after filtering, is applied to the transistor 170 and appears in amplified form across the resistor 178. The amplified signal is applied to the base of the PNP transistor 172. The transistor 172 is connected through a switch arrangement including a S.P.D.T. switch 180 in parallel with the set of contacts 165 of the relay 24 (FIG. 5) to the armature of the motor 28. The armature of the motor 28 is connected through a resistor 182 to the operating voltage source.

When the switch 180 is closed, the relay contacts 165 are short circuited. The signals from the amplifier 134, after amplification in the amplifier including the transistor 170, are applied to the transistor 172 and control the motor armature current and, therefore, the speed of rotation of the motor. The motors 28 and 38 may be permanent magnet motors of known design, such as the motor sold by Rowe Industries, Inc., Sag Harbor, Long Island, New York.

As soon as motor current flows, the voltage across the resistor 182 is applied through a feedback resistor 184 to the base of the transistor 170. Due to the inversion in the amplifier including the transistor 172 and the resistor 182, the voltage applied to the base of the transistor 170 tends to increase the flow of current through the transistor amplifier 170 and the drive voltage on the transistor 172. Accordingly, the connection including the resistor 184 is a positive feedback connection. This positive feedback causes the current through the motor to rise to a maximum value, limited by the motor 28. Accordingly, the motor 28 accelerates to a desired operating speed under control of the transistor 172. The motor control circuit 26 for driving the motor 38 is similar to the circuit 22 in construction and operation.

The resistor 174 is common to both motor control circuits 22 and 26. When current flows through the transistor 170, the voltage on the emitter of the input transistor 170′ in the other motor control circuit 36 is reduced to the extent that this transistor 170′ is biased to cut-off. The motor control circuit 22 is similarly blocked due to interlocked operation of the two motor control circuits 22 and 26 when the amplifier 136 initially provides an input to the other motor control circuit 36. Another interlock connection is provided by the resistor 138 (FIG. 4) which connects the source of operating voltage to the emitters of the transistors 141 and 143 in the amplifiers 134 and 136 (FIG. 4). Accordingly, when output appears initially on the line 114, the voltage drop across the resistor 138 reduces the voltage to the emitter of the transistor 143 whereby that transistor is biased to cut-off.

The provision of positive feedback in the motor control circuit reduces the power consumption in that conditions where motor current insufficient to cause rotation can be drawn are avoided. As soon as even a small amount of armature current flows, the motor starts operating at high speed and draws current only for short periods of time until compensation is effected. This feedback connection also improves the response time of the compensating system. When it is desired to provide for the indication of a vehicle so long as it is present in the detection zone, the compensating circuits may be disabled upon detection of a vehicle by opening the switch 180 in the motor control circuit 22.

*Phase detector output circuit (FIG. 7)*

Figure 7:
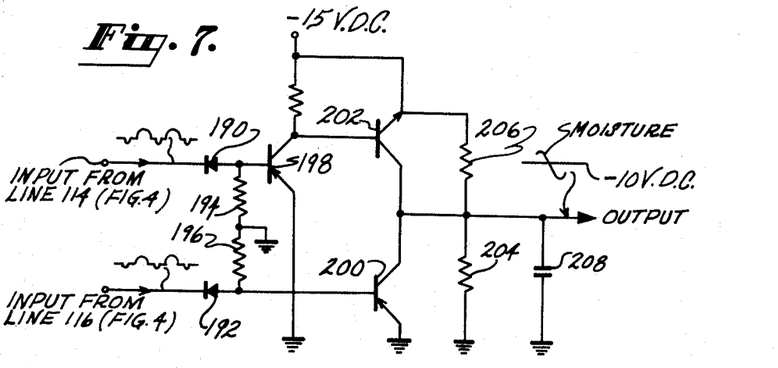
FIG. 7 is a portion of a circuit diagram of another phase detector which may be employed in the system of FIG. 1.

It is sometimes desirable to obtain a single output from the phase detector 50. A circuit for obtaining one output signal which has an amplitude corresponding to the amount of phase shift and a polarity, with respect to a reference signal level, corresponding to the sense of the phase shift is shown in FIG. 7. This circuit includes a pair of diodes 190 and 192 respectively connectable to the lines 114 and 116 of the phase detector 50 shown in FIG. 4. When the circuit shown in FIG. 7 is used, it may be desirable not to use the amplifier output circuits 134 and 136 which are shown connected to the lines 114 and 116 in FIG. 4. The diodes 190 and 192 are connected to ground through equal-valued resistors 194 and 196, and are polarized to pass the negative portions of the signals appearing on the lines 114 and 116. These negative portions, as explained above, have amplitudes and phase displacements corresponding to the phase relationship of the variable waves with respect to the reference waves.

Two transistor amplifiers including PNP transistors 198 and 200 are provided for amplifying the negative signals transmitted through the diodes 190 and 192. The signals representing a phase advance are amplified in the amplifier including the transistor 198 and applied to an amplifier including an NPN transistor 202. The output of the amplifier including the transistor 202 is obtained across an output resistor 204. The output of the amplifier including the transistor 200 appears across another resistor 206 in the collector circuit of the transistor 200. The output resistor 204 is shunted by a filter capacitor 208 which translates the pulses amplified in the amplifiers into a varying D.C. output signal voltage.

In operation, the negative signals representing a phase advance and the presence of a vehicle in the detection zone are amplifier by the transistor 198 and applied, as positive signals, to the base of the transistor 202. The transistor 202 output appears as a negative signal across the output resistor 204. Negative going voltages across the output are indicative of a phase advance and of the presence of a vehicle.

Signals representing a phase delay are amplified in the amplifier including the transistor 200 and the resistor 206. Since the resistor 204 is connected in series with the resistor 206, current flow through the transistor 200 and the resistor 206 is opposite to the direction of current flow through the resistor 204 and the transistor 202. Accordingly, the signals representing a phase delay appear as a positive voltage across the resistor 204. Thus, an output signal which is positive going is indicative of a phase delay and, e.g., of the presence of moisture, while an output signal which is negative going is indicative of a phase advance and the presence of a vehicle.

A relay drive circuit similar to the relay drive circuit shown in FIG. 5, may be connected to the circuit output.

When an output indicative of a vehicle is provided, the relay 24 is operated.

Figure 8:
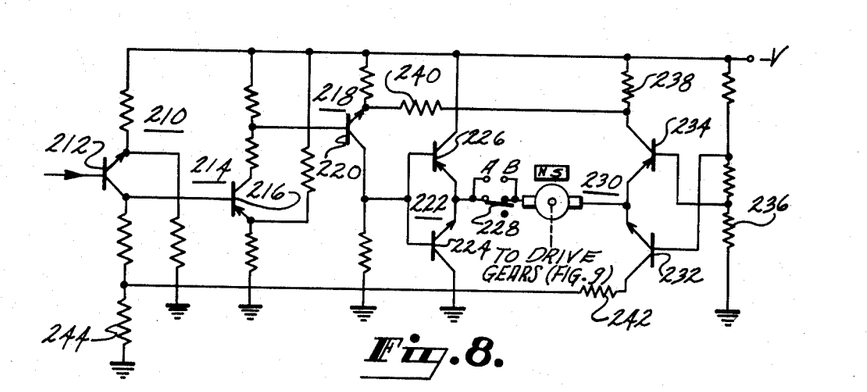
FIG. 8 is a circuit diagram of a motor control circuit which may be employed in the system of FIGS. 1 and 5.

Motor control circuit (FIG. 8)

A motor control circuit utilizing the single output signal generated by the detector output circuit shown in FIG. 7 is illustrated in FIG. 8. A class A transistor amplifier 210 utilizing an NPN transistor 212 amplifies the signal appearing across the capacitor 208 (FIG. 7). The output of the transistor amplifier 210 is applied to another transistor amplifier 214 utilizing a PNP transistor 216. The output of the amplifier 214 is applied to another transistor amplifier 218, using an NPN transistor 220. The collector of the NPN transistor 220 is connected to a transistor current steering circuit 222 using an NPN transistor 224 and a PNP transistor 226 connected in series between the source of operating voltage and ground. The bases of the transistors 224 and 226 are connected to the collector of the transistor 220. The emitters of these transistors are connected through a single pole double throw switch 228 to one side of the armature of a permanent magnet motor 230. The contacts 165 of the relay 24 (FIG. 5) are short-circuited by the switch 228. The switch 228 is opened when the presence detection mode of operation is desired, as explained above in connection with FIG. 6. The opposite side of the armature is connected to a point of reference potential regulated by a circuit including a pair of series connected PNP transistors 232 and 234. The respective bases of these transistors 234 and 232 are connected to different taps on a voltage divider 236 so as to bias the transistors 232 and 234 normally to cut-off.

When a signal of one polarity is applied to the bases of the transistors 224 and 226, one of these transistors is rendered conductive. The voltage on the emitters of the transistors 232 and 234 then changes so that current conduction is permitted through the one of these transistors 232 or 234 of complimentary conductivity type of the conductive transistor 224 or 226 in the steering circuit 222. Accordingly, armature current flows through the armature of the motor 230 in a direction depending upon the polarity of the signals applied to the bases of the transistors 224 and 226 in the steering circuit 222. The motor then rotates in a direction depending upon the polarity of the output signals from the detector output circuit (FIG. 7).

Feed-back connections are provided in order to insure that the motor 230 does not draw current without rotating so as to save power. One of these feed-back connections includes a resistor 238 connected between the collector of the transistor 234 and the source of operating voltage. When the motor 230 turns in one direction, the transistor 234 conducts ahe armature current. The voltage drop across the resistor 238 due to current is applied by way of a resistor 240 to the emitter of the transistor 220. This voltage is in a sense to make the emitter of the transistor 220 go more positive and therefore increase current flow through the transistor 220. The collector of the transistor 220 then becomes more negative. This negative voltage causes more conduction in the transistor 224, which further increases the current flowing through the transistor 234 and the resistor 238. This positive feed-back causes the motor to run as soon as armature current begins to flow.

Another positive feed-back connection includes a resistor 242 connected in the collector circuit of the transistor 232 and a resistor 244 connected in the collector circuit of the transistor 212. When the transistor 232 conducts, the voltage drop across the resistors 242 and 244 is applied to the base of the transistor 216. The sense of the feed-back voltage is such as to increase current flow through the armature in the direction in which the transistor 232 conducts. Thus, the motor 230 will tend to rotate in an opposite direction at maximum constant speed.

Figure 9:
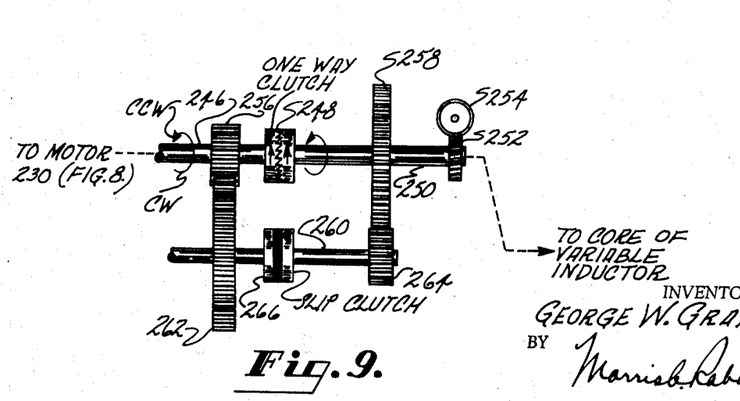
FIG. 9 is a fragmentary view of a gear and clutch mechanism which may be operated by the motor controlled by the motor control circuit shown in FIG. 8.

Gear mechanism (FIG. 9)

A mechanism for coupling the shaft of the motor 230 to the variable impedance element of the compensating means (for example, the movable core 12a of the variable inductor 12 (FIG. 1)) is shown in FIG. 9. The motor shaft is connected to an input shaft 246 which is coupled through a one-way clutch 248 to an output shaft 250. A spur gear 252 is mounted on the shaft 250 and drives a worm gear 254 which may be used to insert or extract the movable core 12a from the inductor 12 (FIG. 1).

A spur gear 256 is mounted on the input shaft 246. Another spur gear 258 having a greater number of teeth than the gear 256 is mounted on the output shaft 250. Another shaft 260 carries two spur gears 262 and 264. The gear 262 has the same number of teeth as the gear 258 and meshes with the gear 256 on the input shaft. The other spur gear 264 has the same number of teeth as the gear 256 and meshes with the gear 258 on the output shaft 250. The gears 256, 264 and 258, 262 may have different numbers of teeth so long as gear ratios are obtained whereby the gear 258 turns slower than the gear 256. The shaft 260 is split into two sections which respectively mount different ones of the gears 262 and 264. A slip clutch 266 of the type which transmits power in either direction until a certain torque is exceeded couples the split shaft 260 sections.

In operation, when the input shaft 246 turns in a clockwise direction as viewed from the left in FIG. 9, power is transmitted from the gear 256 to the gear 262 and the shaft 260 turns in a counter clockwise direction. Because the gear 262 has a larger number of teeth than the gear 256, the shaft 260 rotates much more slowly than the input shaft 246. Rotation of the other spur gear 264 in a counter clockwise direction causes rotation of the spur gear 258 on the output shaft 250, even more slowly than the shaft 260, in a clockwise direction. Since the gear 258 on the output shaft has more teeth than the gear 264 on the shaft 260, the rotation of the output shaft 250 is slower than the rotation of the shaft 260. Assuming, by way of example, that the gear ratio of the gears 256 and 262 is one to three, and the gear ratio of the gears 264 and 258 is also one to three, the output shaft 250 rotates in a clockwise direction at one ninth the speed of rotation of the input shaft 246. This difference in speeds of rotation is accommodated by slippage in the one-way clutch 248. The one-way clutch 248 is designed to transmit torque only in a counter clockwise direction. Accordingly, power is not transmitted through the clutch 248 for input shaft rotation in a clockwise direction.

When the motor 230 drives the input shaft 246 in the counter clockwise direction, torque is transmitted by the one-way clutch 248 so that the output shaft 250 rotates at the same speed as the input shaft in the counter clockwise direction. It follows that counter clockwise rotation of the output shaft 250 is at much higher speed than clockwise rotation thereof. The gears 256 and 258 drive the gears 262 and 264 on the shaft 260 at different speeds of rotation of the gears 262 and 264. This is accommodated by slippage in the clutch 266. The motor 230 is connected in the circuit shown in FIG. 8 to provide rotation of the input shaft 246 in a clockwise direction in response to a phase advance of the variable waves with respect to the reference waves as is indicative of the detection of a vehicle. A phase delay therefore causes counter clockwise rotation of the motor 230. The phase delay condition therefore causes higher speed movement of the core 12a in the variable inductor 12 than a phase advance so that the advantages flowing from more rapid compensation for changes in weather and other ambient conditions than upon vehicle detection are obtained through the use of the mechanism shown in FIG. 9 in and the motor circuit shown in FIG. 8.

From the foregoing description, it will be apparent that there has been provided improved detection apparatus which is responsive to electrical effects that change in opposite senses and which is especially suitable for the detection of vehicles on a highway. Other uses for the invention (for example, in detection of information represented by phase shifts of one wave with respect to another) and other modifications of and variations in the herein described circuits and mechanisms, all within the spirit of the present invention, will, no doubt, become apparent to those skilled in the art. Accordingly, the foregoing description should be taken as illustrative and not in any limiting sense.

What is claimed is:

1. A detection system responsive to an electrical effect which changes in opposite senses comprising,
   (a) means under the influence of said electrical effect having means providing an output corresponding to each of said opposite senses of changes in said effect,
   (b) compensating means coupled to said last named means for providing compensation which changes in one sense and in an opposite sense,
   (c) means responsive to the output of said output means operatively coupled to said compensating means for operating said compensating means relatively rapidly to provide compensation in said one sense,
   (d) means responsive to the output of said output means operatively coupled to said compensating means for operating said compensating means relatively slowly to provide compensation in said opposite sense, and
   (e) means for indicating said changes in said effect responsive to at least one of said opposite changes in said effect.

2. A detection system responsive to an electrical effect which changes in opposite senses comprising,
   (a) means controlled by said effect having a pair of output means each providing an output,
   (b) the output of a first of said pair of output means corresponding to one of said opposite senses of changes in said effect and the output of a second of said pair of output means corresponding to the other of said opposite senses of changes in said effect,
   (c) compensating means operative to provide compensation changing in one sense and in an opposite sense for compensating said electrical effect coupled to said first named means,
   (d) means responsive to the output from said first output means operatively coupled to said compensating means for operating said compensating means relatively rapidly to provide said compensation in one sense,
   (e) means responsive to the output of said second output means operatively coupled to said compensating means for operating said compensating means relatively slowly to provide compensation in said opposite sense, and
   (f) means responsive to one of said first and second outputs for indicating said effect.

3. An object detection system comprising,
   (a) a sensing device having a varying impedance and which responds to the presence of an object and to changes in ambient conditions by changes in its impedance in opposite senses, said sensing device responding to said object by changes in its impedance in one of said opposite senses,
   (b) detector circuit means for providing an output corresponding to said changes in impedance of said device in said opposite senses,
   (c) a variable impedance compensating element coupled to said sensing device,
   (d) means responsive to said output corresponding to said impedance change in one sense for operating said variable impedance element to vary its impedance relatively rapidly in one sense for changes in impedance in one sense in said sensing device,
   (e) means responsive to said output corresponding to said impedance change in the opposite sense for operating said variable impedance element relatively slowly in an opposite sense for changes in impedance in the opposite sense in said sensing device, and
   (f) means responsive to changes in said output in one of said opposite senses for indicating the presence of said object.

4. A vehicle detection system comprising,
   (a) a sensing device responsive to the presence of a vehicle by changes in impedance in a first sense and also responsive to changes in weather and other ambient conditions by changes in impedance in said first sense and in a second and opposite sense,
   (b) detector circuit means coupled to said sensing device for providing an output corresponding to said first and said second senses of changes in said sensing device impedance,
   (c) a variable impedance element coupled to said sensing device for providing impedance changes in opposite senses to compensate respectively for said impedance changes in said device in said first and second senses,
   (d) means responsive to said output and coupled to said element for changing the impedance of said element relatively slowly in one of said opposite senses when said output changes in said first sense,
   (e) means responsive to said output and coupled to said element for changing the impedance of said element relatively rapidly in the other of said opposite senses when said output changes in the second sense, and
   (f) means also responsive to said output for indicating the presence of a vehicle when said output corresponds to changes in impedance of said device in said first sense of greater than a certain magnitude.

5. A vehicle detection system comprising
   (a) a sensing device responsive to the presence of a vehicle by changes in its impedance in a first sense and to other effects by changes in its impedance in the opposite sense,
   (b) detector circuit means for providing first and second outputs corresponding, respectively, to changes in impedance of said device in different ones of said opposite senses,
   (c) a variable impedance compensating element coupled to said sensing device,
   (d) mechanism coupled to said element movable in opposite directions to vary the impedance of said element in opposite senses,
   (e) first and second electrical motors,
   (f) means responsive to said first output for operating said first motor to rotate at a certain speed,
   (g) means responsive to said second output for operating said second motor to rotate at approximately said certain speed,
   (h) first and second gear mechanisms respectively providing slower and faster output speeds for the same input speed, said first and second gear mechanisms being coupled, respectively, to said first motor and said second motor, said first and second gear mechanisms also being coupled to said variable impedance element to drive said element in opposite directions, and
   (i) an output circuit responsive to said first output for indicating the presence of said vehicle when said first output exceeds a predetermined magnitude.

passing along a highway over a detection zone com-

6. A system for detecting the presence of a vehicle prising
   (a) a sensing coil disposed in said highway and defining said detection zone,
   (b) a capacitor connected across said sensing coil for providing a circuit tuned to a predetermined frequency,
(c) a variable reactance element connected in said tuned circuit and including means mechanically movable in opposite directions for changing the reactance of said element in opposite senses,
(d) a phase detector circuit having a pair of inputs and a pair of outputs,
(e) means for applying reference waves at said certain frequency to one of said phase detector inputs,
(f) means for applying said reference waves through said tuned circuit to the other of said phase detector inputs
(g) said sensing coil shifting the phase of said waves applied to said other phase detector input in first and second opposite senses in response to weather and other ambient conditions, and in said first sense in response to the passage of a vehicle into said sensing zone,
(h) means included in said phase detector for providing a signal from one of its said pair of outputs in response to said phase shift in said first sense and for providing an output signal from the other of its said pair of outputs in response to a phase shift in said second sense,
(i) first and second motors,
(j) first and second motor control circuits respectively operated by said first output and said second output and respectively coupled to drive said first and second motors,
(k) mechanism coupling said first motor to said mechanically movable means for driving said last-named means in said one direction relatively slowly,
(l) mechanism coupling said second motor to said mechanically movable means for driving said mechanically movable means in the opposite direction relatively rapidly,
(m) a relay,
(n) a relay drive circuit operated by said first output for operating said relay when said first output exceeds a predetermined magnitude, and
(o) utilization means operated by said relay for indicating the presence of a vehicle in said detection zone.

7. A vehicle detection system comprising
(a) a sensing device having an impedance which responds to the presence of an object and to changes in ambient conditions by changes in its impedance in opposite senses, said sensing device responding to said vehicle by changes in its impedance in one of said opposite senses,
(b) detector circuit means for providing an output corresponding to said changes in impedance of said device in said opposite senses,
(c) a variable impedance compensating element coupled to said sensing device and mechanically actuable in opposite directions at differing output speeds to provide changes in said sensing device impedance in opposite senses at said differing output speeds,
(d) mechanism coupled to said variable impedance element for actuating said device in said opposite directions at said differing output speeds for the same input speed, said mechanism comprising
 (1) an input shaft and output shaft,
 (2) a one way clutch mounted between said input shaft and said output shaft,
 (3) a pair of gears, one mounted on said input shaft and the other mounted on said output shaft,
 (4) another pair of gears, a first one having a higher number of gear teeth than said one gear and the second one having a smaller number of teeth than said other gear mounted on other shafts and meshing, respectively, with said one and said other of said first mentioned pair of gears for operating said output shaft in opposite directions at said differing output speeds,
 (5) a bi-directional slip clutch coupling said other shafts, and
 (6) means coupling said output shaft to mechanically actuate said variable impedance element in opposite directions at said differing output speeds when said output shaft turns in said opposite directions at said differing output speeds,
(e) an electric motor for driving said input shaft in opposite directions,
(f) motor control means responsive to said detector circuit means output for operating said motor to rotate in one direction and in an opposite direction for different ones of said opposite senses of said changes in impedance of said sensing device, and
(g) means responsive to changes in said output in said one of said opposite senses for indicating the presence of said vehicle.

8. A vehicle detection system comprising
(a) vehicle sensing means responsive to the presence of a vehicle by changes in impedance,
(b) a generator of alternating current reference waves,
(c) means responsive to said changes in impedance of said sensing means for providing variable alternating current waves shifted in phase with respect to said reference alternating current waves and of the same frequency as said reference waves,
(d) phase sensitive coincident circuit means responsive to coincident and separated portions of alternate half cycles of said reference and variable waves for providing a train of output pulses having components of the same frequency as said waves when said reference and variable waves are out of phase and having a frequency twice the frequency of said waves when said reference and variable waves are in phase,
(e) filter circuit means responsive to said train of pulses for deriving an alternating current signal of the same frequency as said waves and corresponding to said changes in impedance,
(f) a balanced type detector circuit responsive to said reference waves and said amplified alternating current signals for providing direct current signals corresponding to said changes in impedance, and
(g) means responsive to the amplitude of said direct current signals for indicating the presence of said vehicle.

9. A vehicle detection system comprising
(a) vehicle sensing means having an impedance which changes in opposite senses, said sensing means responding to a vehicle by an impedance change in one of said two opposite senses,
(b) means responsive to said changes in impedance of said sensing means for providing variable alternating current waves shifted in phase with respect to reference alternating current waves of the same frequency as said variable waves by an amount and in a sense corresponding to the amount and sense of said changes in impedance,
(c) circuit means responsive to said waves for providing a train of output pulses having components of the same frequency as said waves when said reference and variable waves are out of phase and having twice the frequency of said waves when said reference and variable waves are in phase,
(d) filter circuit means responsive to said train of pulses for deriving an alternating current signal of the same frequency as said waves,
(e) alternating current amplification means for amplifying said alternating current signal,
(f) a balanced-type detector circuit responsive to said reference waves and said amplified alternating current signal for providing direct current output signals representing the amplitude and sense of said changes in impedance of said sensing means, (g) means responsive to the amplitude of said direct current signals for indicating the presence of said vehicle, (h) compensating means including a variable impedance element coupled to said vehicle sensing means for compensating for said changes in impedance, and (i) means responsive to said direct current output signals for controlling the sense of variation of the impedance of said element to compensate for said impedance change in said sensing means relatively slowly for said impedance changes in said one of said opposite senses and relatively rapidly for said impedance changes in the other of said opposite senses.

References Cited by the Examiner

UNITED STATES PATENTS

| | | | |
|---|---|---|---|
| 2,231,996 | 2/1941 | Guanella et al. | 328—141 |
| 2,194,986 | 3/1940 | Nessell | 318—19 |
| 2,708,718 | 5/1955 | Weiss | 328—134 |
| 2,917,732 | 12/1959 | Chase et al. | 340—38 |
| 2,943,306 | 6/1960 | Gray et al. | 340—258 |
| 2,983,852 | 5/1961 | Gray | 340—258 X |
| 3,052,869 | 9/1962 | Mountjoy | 340—38 |

FOREIGN PATENTS 938,376    4/1948    France.

NEIL C. READ, *Primary Examiner.*